US008264489B2

(12) United States Patent
Saint-Hilaire et al.

(10) Patent No.: US 8,264,489 B2
(45) Date of Patent: Sep. 11, 2012

(54) INTERFACE REMOTING

(75) Inventors: Ylian Saint-Hilaire, Hillsboro, OR (US); Bryan Y. Roe, Camas, WA (US); Nelson F. Kidd, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/618,203

(22) Filed: Jul. 11, 2003

(65) Prior Publication Data
US 2005/0022131 A1 Jan. 27, 2005

(51) Int. Cl.
G06T 13/00 (2011.01)

(52) U.S. Cl. ........................................ 345/473; 345/474

(58) Field of Classification Search .................... None
See application file for complete search history.

(56) References Cited

U.S. PATENT DOCUMENTS

| | | | | |
|---|---|---|---|---|
| 4,600,919 A * | 7/1986 | Stern | | 345/473 |
| 5,790,137 A * | 8/1998 | Derby et al. | | 345/557 |
| 5,825,363 A * | 10/1998 | Anderson | | 345/422 |
| 6,226,642 B1 * | 5/2001 | Beranek et al. | | 348/211.13 |
| 6,331,851 B1 * | 12/2001 | Suzuki et al. | | 345/419 |
| 6,369,821 B2 * | 4/2002 | Merrill et al. | | 345/473 |
| 6,377,276 B1 | 4/2002 | Ludtke | | |
| 6,557,041 B2 * | 4/2003 | Mallart | | 709/231 |
| 7,533,406 B2 * | 5/2009 | Ludvig et al. | | 725/110 |
| 2002/0030843 A1 | 3/2002 | Tuli | | |
| 2002/0032751 A1 * | 3/2002 | Bharadwaj | | 709/218 |
| 2002/0115477 A1 | 8/2002 | Singh | | |
| 2003/0041106 A1 | 2/2003 | Tuli | | |
| 2003/0182469 A1 * | 9/2003 | Lok et al. | | 709/328 |
| 2004/0061703 A1 * | 4/2004 | Chik et al. | | 345/467 |
| 2004/0139208 A1 | 7/2004 | Tuli | | |

FOREIGN PATENT DOCUMENTS
EP 1120748 8/2001

OTHER PUBLICATIONS

Tristan Richardson and Kenneth R. Wood, "The. RFB Protocol" ORL Cambridge, Version 3.3. Jan. 1998.*
Noimark, Y., Cohen-Or, D. "Streaming scenes to MPEG-4 video-enabled devices", Computer Graphics and Applications, IEEE, Publication Date: Jan./Feb. 2003, vol. 23, Issue: 1, on pp. 58-64.*

(Continued)

Primary Examiner — Daniel Hajnik
(74) Attorney, Agent, or Firm — Blakely, Sokoloff, Taylor & Zafman LLP

(57) ABSTRACT

Machine-readable media, methods, and apparatus are described for interface remoting. In some embodiments, a server may transmit motion commands to a remote device to update a graphical user interface displayed on the remote device. The motion commands may reference an image object of the remote device and may request the remote device to animate the image object. In some embodiments, the animation specified by the motion commands result in the remote device moving the image object from one location to another location, scaling the image object from a first scale to a second scale, and/or rotating the image object from a first orientation to a second orientation.

22 Claims, 8 Drawing Sheets

OTHER PUBLICATIONS

Foley et al—Graphics Hardware—Simple Animation Effects and Image Compositing, 1997—pp. 180-182, 835 XP002256747.

Walker et al—Remote I/O: Freeing the Experience From the Platform With UPNP Architecture—Intel Technology Journal—Interoperable Home Infrastructure vol. 6, No. 4—Nov. 15, 2002 pp. 30-36, XP002304265.

Intel—Overview of UPNP AV Architecture—Jul. 2, 2003—pp. 1-9, XP002304266—http://www.intel.com/technology/UPnP/doc.htm.

Notice of Registration with Notice of the Granting of a Patent Right for an Invention from counterpart China Patent Application No. 2004100690304, mailed Dec. 8, 2006, 5 pages (Translations included).

Office Action from foreign counterpart European Patent Application No. 04756632.8, mailed Jul. 13, 2009, 4 pages.

ISR and Written Opinion of the International Searching Authority for counterpart PCT Patent Application No. PCT/US2004/021428, mailed Dec. 10, 2004, 16 pages.

Notice of Allowance from foreign counterpart Taiwan Patent Application No. 93120455, mailed Jan. 9, 2006, 3 pages.

Office Action from European Patent Application No. 04756632.8, mailed Jul. 8, 2008, 8 pages.

* cited by examiner

INTERFACE REMOTING

BACKGROUND

Home media devices that playback various types of digital media such as digital audio and/or digital video have recently entered the marketplace. One problem with several home media device offerings is that they are too expensive for wide consumer adoption. Some home media devices have reduced hardware specifications and functionality in order to meet perceived consumer price points. User interfaces are one area in which some home media devices have attempted to reduce costs. For example, some home media devices provide very minimal interfaces such as a few buttons, LEDs, and/or small LCD displays. However, consumers have become accustomed to personal computers that provide dynamic, full feature graphical user interfaces and desire similar functionality from home media devices.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for remotely displaying a graphical user interface of an application and/or service. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment". "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media and flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
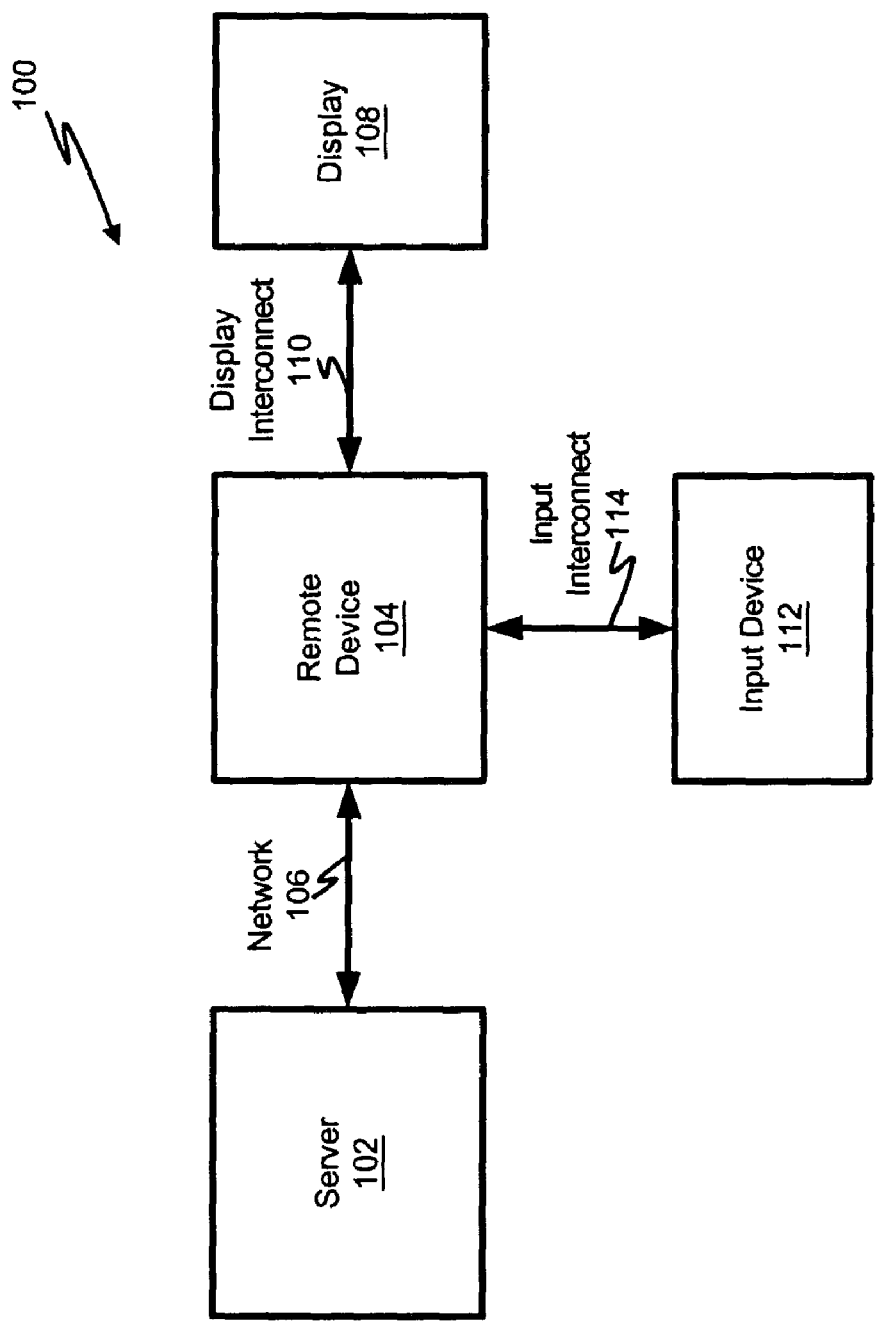
FIG. 1 illustrates an embodiment of a system for remotely displaying a graphical user interface of one or more applications and/or services.

An example embodiment of a system 100 for remotely displaying a graphical user interface (GUI) is shown in FIG. 1. The system 100 may comprise a server 102 coupled to a remote device 104 via a network 106. The server 102 may execute applications and/or services such as, for example, digital audio, digital video, and digital photography playback applications and/or services. The server 102 may further generate a GUI in response to executing the applications and/or services and may transmit commands on the network 106 that request the remote device 104 to display the GUI of such applications and/or services.

The network 106 may comprise one or more communications mediums such as, for example, CAT 5 cables, phone lines, power lines, coaxial cables, radio frequency (RF) signals, and infrared (IR) signals. The network 106 may further support one or more networking protocols such as, for example, Ethernet protocol, Transmission Control Protocol (TCP), User Datagram Protocol (UDP), Internet Protocol (IP), IEEE 802.11a, IEEE 802.11b, IEEE 802.11g, Bluetooth protocols, and Universal Plug and Play Protocol (UPnP).

The remote device 104 may be further coupled to a display 108 via a display interconnect 110. The display 108 may comprise a cathode ray tube (CRT) television, CRT computer display, a flat panel television, a flat panel computer display, or other display device to present visual information to a user of the remote device 104. Further, the display interconnect 110 may utilize one or more interconnects such as, for example, S-Video cables, composite video cables, video graphics adapter (VGA) cables, digital video output (DVO) cables, and/or wireless interconnects.

The remote device 104 may be further coupled to an input device 112 via an input interconnect 114. The input device 112 may comprise for example a mouse, a track ball, a keyboard, a remote control, and/or microphone via which a user of the remote device 104 may request the remote device 104 to perform various operations. The input interconnect 114 may utilize one or more interconnects such as, for example, universal serial bus (USB) cables, IEEE 1394 cables, and/or wireless interconnects.

The server 102 and the remote device 104 may be implemented in a similar manner. For example, each may be implemented with a general purpose computer system such as, personal computer (PC) or workstation. However, in one embodiment, the server 102 has more processing power than the remote device 104. In another embodiment, the remote device 104 may comprise a special purpose computing device such as, for example, a rack stereo component, television set-top box, or personal digital assistant.

Figure 2:
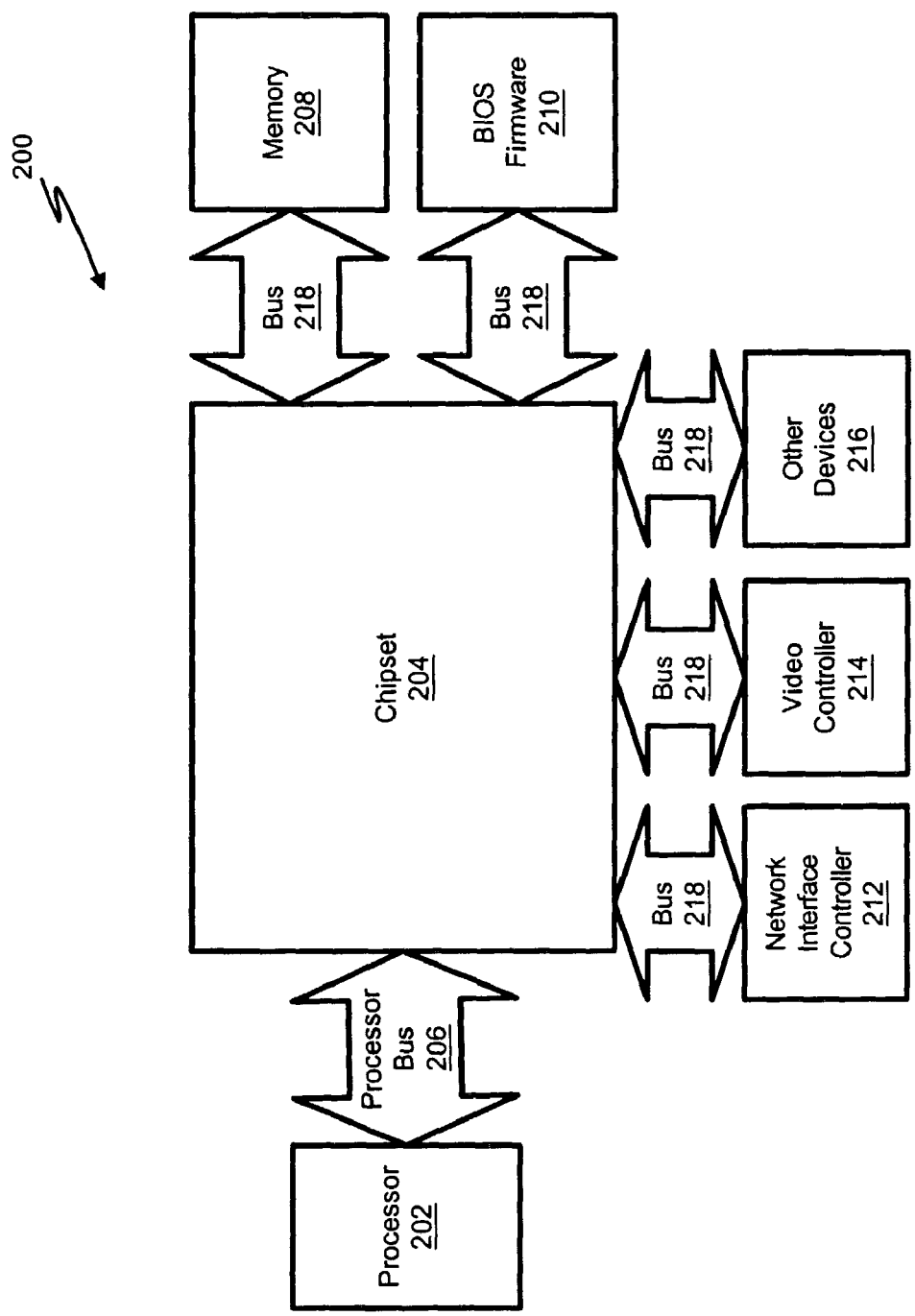
FIG. 2 illustrates an embodiment of computing device suitable to implement the server and/or remote client of FIG. 1.

Referring now to FIG. 2, an example embodiment of a computing device 200. The example computing device 200 of FIG. 2 may be used to implement the server 102 or the remote device 104 of FIG. 1. As depicted, the computing device 200 may comprise one or more processors 202. The processors 202 may perform actions in response to executing instructions. As stated above, the server 102 may have more processing power than the remote device 104. For example, the processor 202 of the server 102 may comprise a 3 GHz INTEL® Pentium 4 whereas the processor 202 of the remote device 104 may comprise a 500 MHz INTEL® XScale processor (The term "INTEL" is used in this document without derogation of Intel Corporation's trademark rights).

The computing device 200 may further comprise a chipset 204 that is coupled to the processors 202 via a processor bus 206. The chipset 204 may comprise one or more integrated circuit packages or chips that couple the processors 202 to memory 208, firmware 210, a network interface controller 212, a video controller 214, and other devices 216 (e.g. a mouse, keyboard, video controller, hard disk, floppy disk, wireless receivers, wireless transmitters, etc.) For example, the chipset 204 may comprise peripheral component interconnect (PCI) controllers, accelerated graphics port (AGP) controllers, universal serial bus (USB) controllers, low pin count (LPC) bus controllers, and/or other input and/or output (I/O) controllers to control and transfer data via respective buses 218.

The memory 208 may comprise memory devices having addressable storage locations that may be read from and/or written to. The memory 208 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices.

The firmware 210 may comprise routines which the computing device 200 may execute during system startup in order to initialize the processors 202, chipset 204, and other components of the computing device 200. Moreover, the firmware 210 may comprise routines or drivers which the computing device 200 may execute to communicate with one or more components of the computing device 200.

In one embodiment, the network interface controller 212 may comprise an add-in card such as, for example, a PCI add-in card or a PCI-Express add-in card that transmit and receive networking signals over the network 106. In another embodiment, the network interface controller 212 or portions thereof may be integrated into one or more chips of the chipset 204.

Similarly, the video controller 214 may comprise an add-in card such as, for example, an AGP add-in card, PCI add-in card or a PCI-Express add-in card that generates one or more video signals to drive the display 108 via the display interconnect 110. In another embodiment, the video controller 214 or portions thereof may be integrated into one or more chips of the chipset 204.

Figure 3:
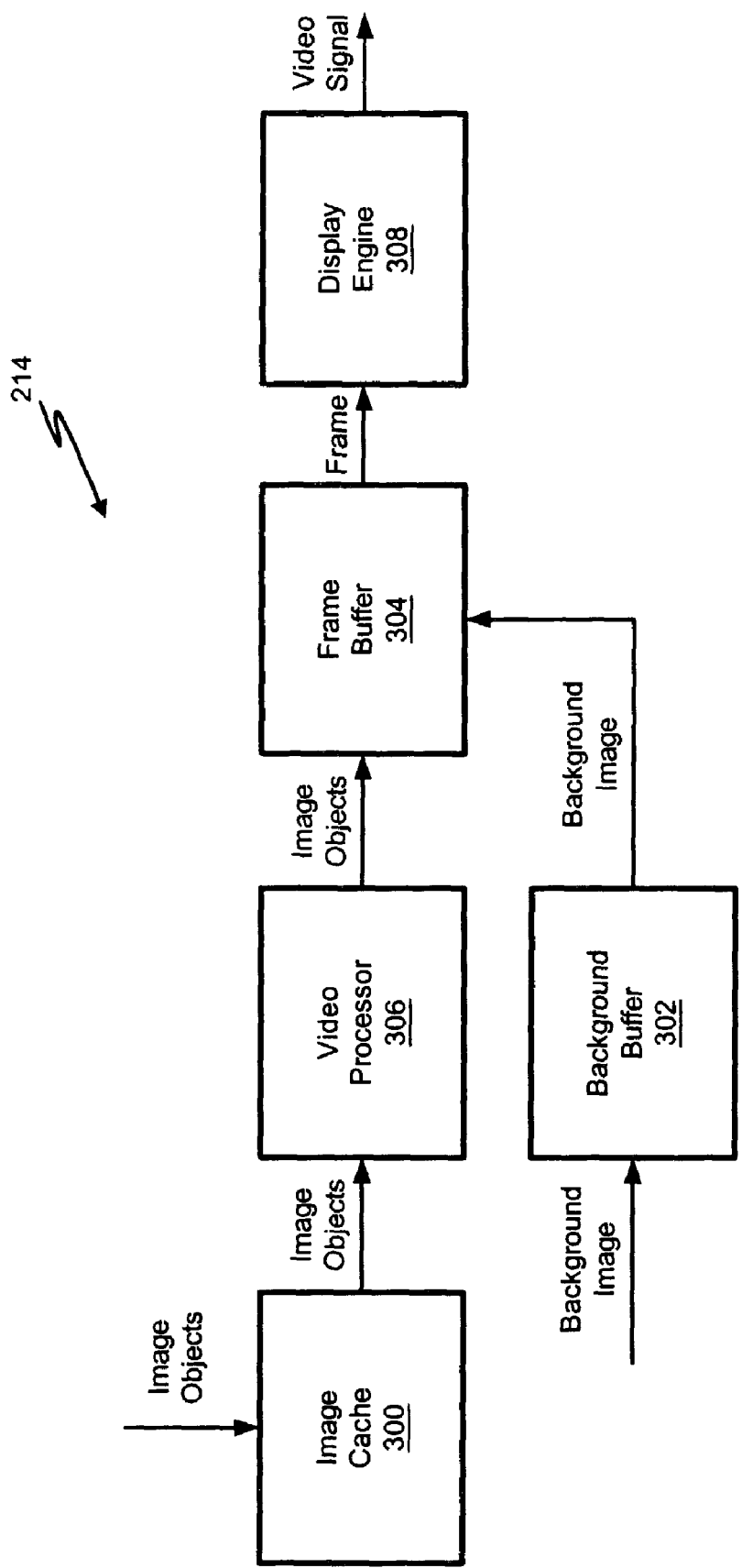
FIG. 3 illustrates an embodiment of a video controller suitable for the remote client of FIG. 1.

Referring now to FIG. 3, an embodiment of a video controller 214 of the remote device 104 is shown. As depicted, the video controller 214 may comprise an image cache 300, a background buffer 302, a frame buffer 304, a video processor 306, and a display engine 308. The image cache may store image objects in an uncompressed bitmap format, a compressed bitmap format, or some other image format. In one embodiment, the image objects may comprise a rectangular array of pixels. Each pixel may comprise one or more color channels and an alpha channel that represents a transparency level of the respective pixel. By setting portions of the rectangular image object as fully transparent, the alpha channel may be used to display rectangular image objects that appear as non-rectangular shapes (e.g. circles, ovals, triangles, etc.). The image cache may further associate an index with each image object. The index may be used to retrieve, delete, and/or alter an image object of the image cache 300.

The background buffer 302 may store a background image in an uncompressed bitmap format, a compressed bitmap format, or some other image format. In one embodiment, the background buffer 302 may store an uncompressed bitmap image that has the same pixel dimensions (e.g. 640×480) as the display 108. As a result of the above properties of the stored background image, the video processor 306 may quickly and efficiently blit the background image to the frame buffer 304.

The video processor 306 may update the frame buffer 304 based upon commands received from the server 102. In one embodiment, the video processor 306 supports the following commands: DrawImage(IMAGE, X1, Y1); DrawFillBox (X1, Y1, X2, Y2, C); LoadImage(IMAGE, INDEX); DeleteImage(INDEX); SetMotionVector(INDEX, X1, Y1, X2, Y2, F1, S1, S2, F2, R1, R2, F3, FLAGS); DramImageFromCache (INDEX, X1, Y1). However, the video processor 306 may support additional commands, may not support one or more of the above commands, and/or may not support all parameters of one or more of the above commands.

The server 102 may transmit the DrawImage command to remote device 104 to request an image object be displayed at a specified location on the display 108. For example, the server 102 may transmit the DrawImage command to the remote device 104 with an uncompressed bitmap image object IMAGE, an x-axis coordinate X1, and a y-axis coordinate Y1. The video processor 306 may uncompress and/or transcode the image object IMAGE if not already in a format suitable for the background buffer 302 and may place the bitmap image object IMAGE in the background buffer 302 at location (X1, Y1). The video processor 306 may later update a frame of the frame buffer 304 with the background image stored in background buffer 302, and the display engine 308 may generate a video signal that results in the display 108 presenting the background image with the image object IMAGE at location (X1, Y1).

The server 102 may transmit the DrawFillBox command to remote device 104 to request a filled box be displayed at a specified location on the display 108. For example, the server 102 may transmit the DrawFillBox command to the remote device 104 with an x-axis coordinate X1, a y-axis coordinate Y1, an x-axis coordinate X2, a y-axis coordinate Y2, and a color C. In one embodiment, the locations (X1, Y1) and (X2, Y2) specify two corners of a rectangular region. The video processor 306 may determine a rectangular region of the background buffer 302 based upon these two locations and may fill the rectangular region with the color C. The video processor 306 may later update a frame of the frame buffer 304 with the background image of background buffer 302, and the display engine 308 may generate a video signal that results in the display 108 presenting the background image with the filled rectangular region defined by the location (X1, Y1), (X2, Y2).

The server 102 may transmit the LoadImage command to remote device 104 to request an image object be stored in the image cache 300. For example, the server 102 may transmit the LoadImage command to the remote device 104 with an uncompressed bitmap image object IMAGE and an index INDEX. The video processor 306 may uncompress and/or transcode the image object IMAGE if not already in a format suitable for the image cache 300, and may store the bitmap image object IMAGE in one or more an unused or available storage locations of the image cache 300. The video processor 306 may further associate the index INDEX with the image object IMAGE so that commands may reference the image object IMAGE using the index INDEX.

The server 102 may transmit the DeleteImage command to remote device 104 to request an image object be removed from the image cache 300. For example, the server 102 may transmit the DeleteImage command to the remote device 104 with an index INDEX that identifies an image object of the image cache 300. The video processor 306 may effectively delete the image referenced by the index INDEX. Depending upon the implementation of the image cache 300, the video processor 306 may delete the referenced image object using various techniques. For example, the video processor 306 may simply disassociate the index INDEX from the image cache 300 and may store one or more future image objects over the deleted image object. However, other mechanisms for managing the image cache 300 are possible such as, for example, zeroing out the deleted image object and/or marking the storage locations of the deleted image object as unused or available.

Figure 4:
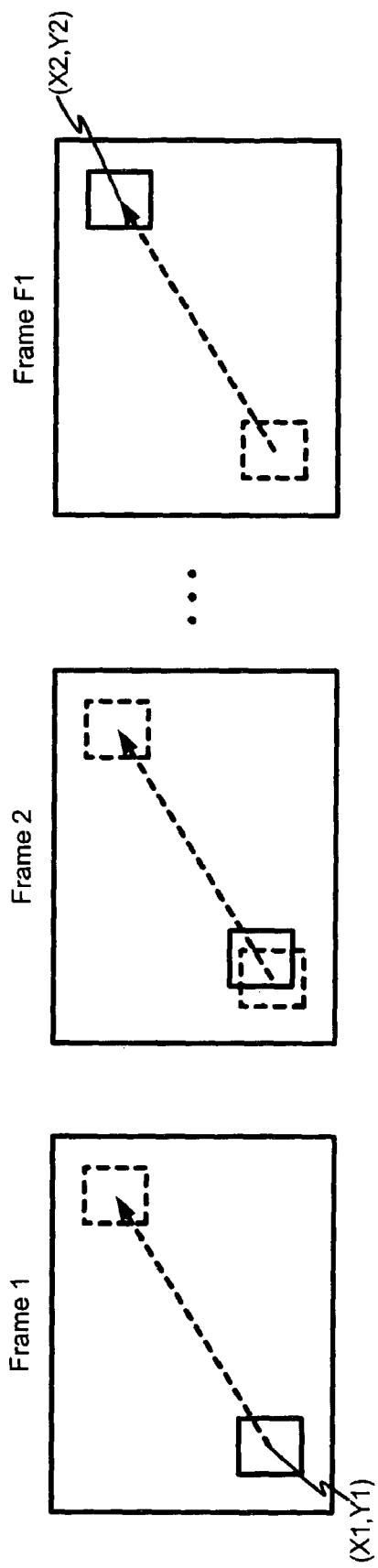
FIG. 4 illustrates animating an image object by moving the image object from a first location to a second location over a period of time.

The server 102 may transmit the SetMotionVector command to the remote device 104 to request an image object of the image cache 300 be animated in a specified manner on the display 108. For example, the server 102 may transmit the SetMotionVector command to the remote device 104 with an index INDEX that references an image object of the image cache 300, an x-axis coordinate X1, a y-axis coordinate Y1, an x-axis coordinate X2, a y-axis coordinate Y2, and a time period F1. The video processor 306 may retrieve the image object associated with the index INDEX and may periodically update the frame buffer 304 such that the image object moves from location (X1, Y1) to location (X2, Y2) over the time period F1 as depicted in FIG. 4. In one embodiment, the time period F1 is specified as a number of frames. Other embodiments may specify the time period using other techniques such as, for example, specifying a number of clock cycles, a number of seconds, a number of microseconds, a time of day (e.g. wall time), etc.

Figure 5:
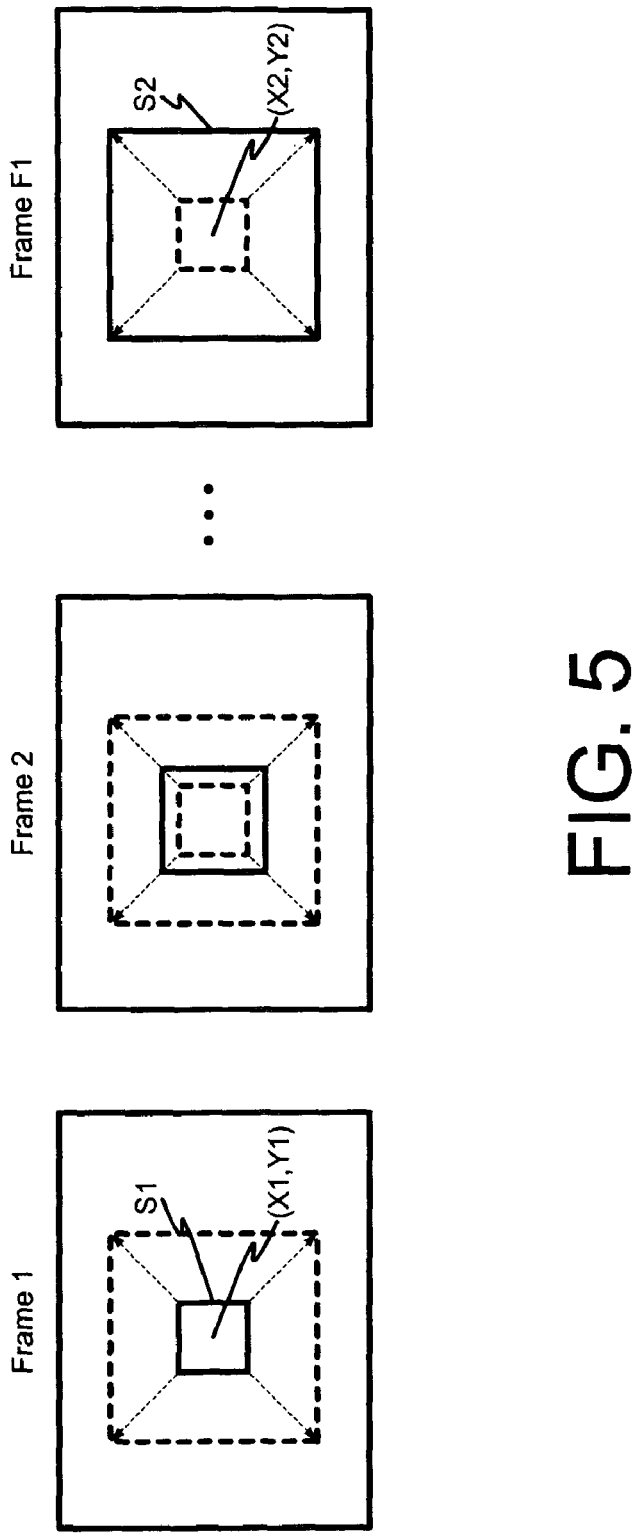
FIG. 5 illustrates animating an image object by scaling the image object from a first scale to a second scale over a period of time.
Figure 6:
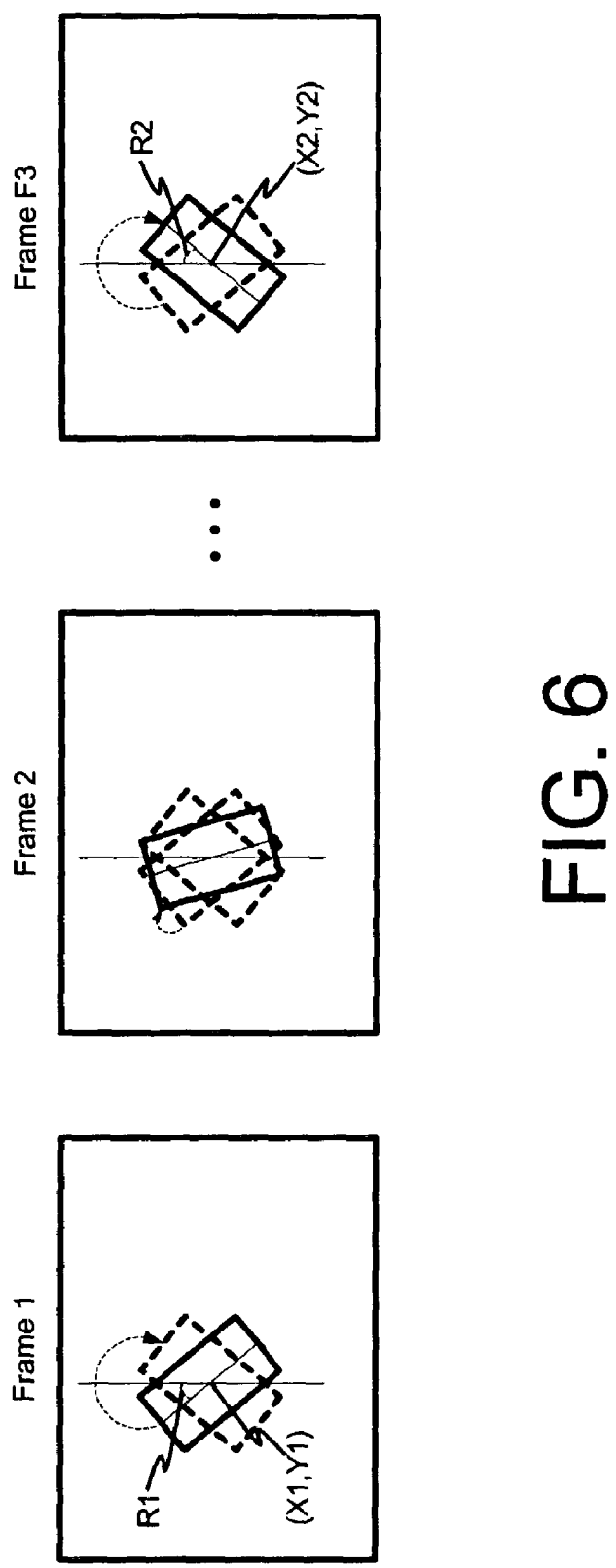
FIG. 6 illustrates animating an image object by rotating the image object from a first orientation angle to a second orientation angle over a period of time.

The server 102 may further transmit a scale S1, a scale S2, and a time period F2 with the SetMotionVector command. In response to the scale S1, the scale S2, and the time period F2, the video processor 306 may further periodically update the frame buffer 304 such that the image object is displayed initially at the scale S1 and is transitioned to the scale S2 over the time period F2 as depicted in FIG. 5. The server 102 may also specify an orientation angle R1, an orientation angle R2, and a time period F3 with the SetMotionVector command. In response to the orientation angle R1, the orientation angle R2, and the time period F3, the video processor 306 may further periodically update the frame buffer 304 such that the image object is displayed initially at the orientation angle R1 and is rotated to the orientation angle R2 over the time period F3 as depicted in FIG. 6.

The server 102 may also supply the SetMotionVector command with flags FLAGS. The flags FLAGS may provide status information and/or control information. In one embodiment, the server 102 may activate a completion flag of the flags FLAGS to request the remote device 104 to inform the server 102 when the SetMotionVector command is completed. In another embodiment, the server 102 may set one or more transition mode flags to configure the manner by which the remote device 104 transitions from one location (X1, Y1) to another location (X2, Y2), from one scale S1 to another scale S2, from one orientation angle R1 to another orientation angle R2. In one embodiment, the remote device 104 may support linear transitions, accelerated transitions, and/or other transition types. In response to a linear transition, the video processor 306 may periodically update the frame buffer 304 such that the image object appears to move at a constant rate over the time period. On the other hand, the video processor 306 in response to an accelerated transition may periodically update the frame buffer 304 such that the image object appears to accelerate from its starting location and appears to decelerate into its final location. Moreover, the flags FLAGS may indicate units of the parameters. In one embodiment, one or more time flags may specify whether time periods are specified in frames, clock cycles, and/or some other unit. Similarly, one or more coordinate system flags may specify whether respective locations are specified using a Cartesian coordinate system, a polar coordinate system, and/or some other coordinate system.

In one embodiment, the server 102 may also set one or more of the parameters to a predetermined value (e.g. 0x7FFF) to instruct the video processor to ignore the parameter and/or to inform the video processor that the parameter is implicitly defined. For example, the server 102 in one embodiment may use the SetMotionVector command to request the remote device 104 to display an image object at a particular location (X1, Y1) and to scale the image object over a time period F2. In particular, the server 102 may specify values for the location (X1, Y1), the scale S1, the scale S2, the time period F2, and the flags FLAGS, and may set the location (X2, Y2), the time period F1, the orientation angle R1, the orientation angle R2, and the time period F3 to the predetermined value to request the video processor 306 to ignore such parameters. In the above example, the server 102 may implicitly define the location (X1, Y1) by setting them to the predetermined value. In which case, the video processor 306 may use the current location of the image object.

In one embodiment, the video processor 306 may effectively set a start parameter (e.g. X1, Y1, S1, R1) equal to the image object's currently displayed value for the respective start parameter if the start parameter is set to the predetermined value. Similarly, the video processor 306 may effectively set an end parameter (e.g. X2, Y2, S2, R2) equal to the image object's previous value for the end parameter if the end parameter is set to the predetermined value. Further, the video processor 306 may effectively set a time period (e.g. F1, F2, F3) equal to the image object's previous value for the time parameter if the time period is set to the predetermined value and at least one of the corresponding start and end parameters is set to a value other than the predetermined value. On the other hand, if both the start parameter and end parameter are set to the predetermined value, then the video processor 306 may simply not perform the corresponding sub-operation (e.g. Move, Scale, Rotate). In one embodiment, as a result of the above behavior, the video processor 306 may support in flight alteration of an image objects animation. For example, a server 102 may provide the remote device 104 with a SetMotionVector command with the start location (X1,Y1) set to the predefined value and a new end location (X2, Y2) to change the ending location of an image object that is already in motion due to a previous yet to be completed SetMotionVector command.

Figure 7:
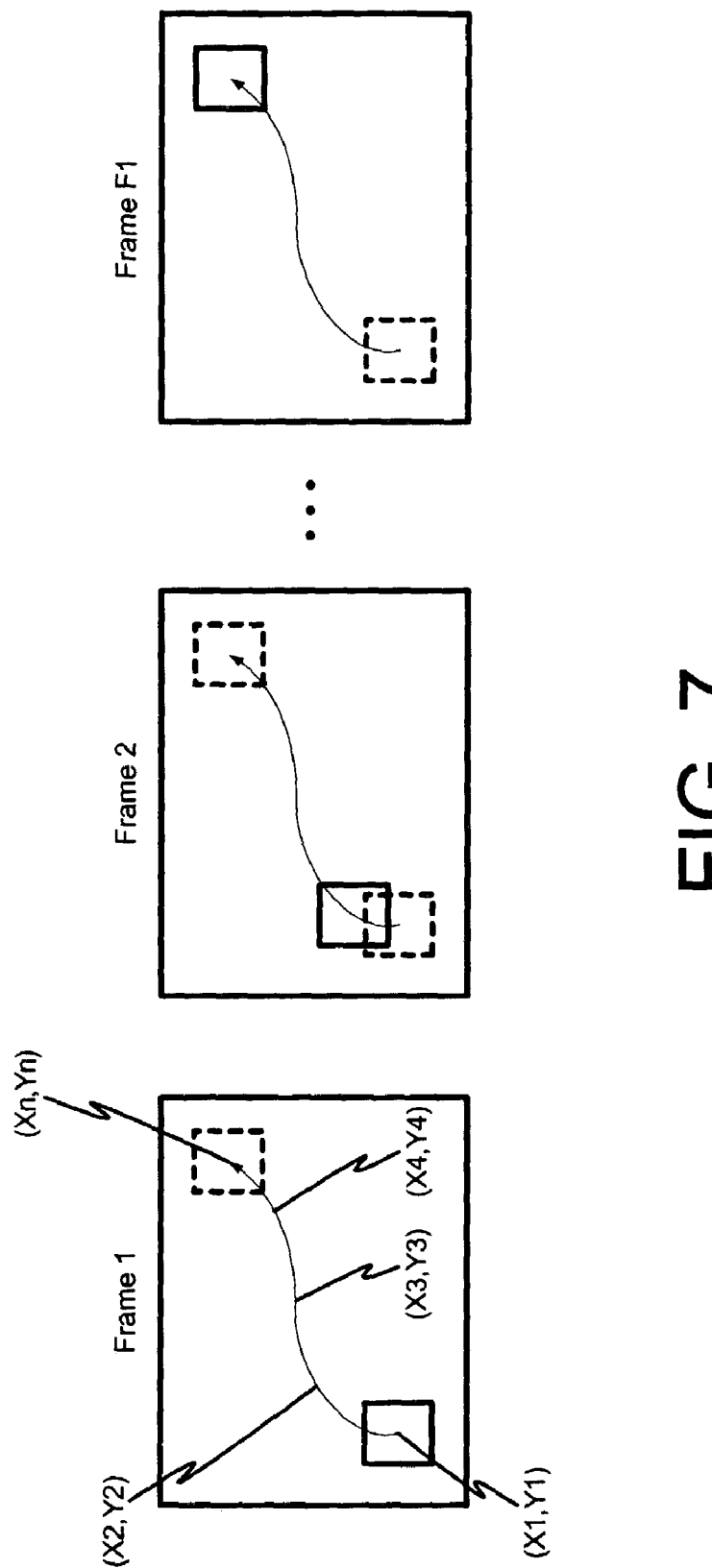
FIG. 7 illustrates animating an image object by moving the image object along a curve over a period of time.

The system 100 may comprise additional and/or alternative commands to those mentioned above. For example, the system 100 may comprise an ImageMoveLine command to move an image object IMAGE from location (X1,Y1) to (X2, Y2) of time period F1, an ImageScale command to scale an image object IMAGE from scale S1 to scale S2 over time period F1, and an ImageRotate command to rotate an image object IMAGE from an orientation angle R1 to an orientation angle R2 over a time period F1. The system may further comprise an ImageMoveCurve command that may be used to request an image object IMAGE of the image cache 300 be moved along a specified curve. For example, the server 102 may transmit the ImageMoveCurve command to the remote device 104 with a list of locations (X1,Y1), (X2,Y2) ... (Xn, Yn), an index INDEX that references an image object IMAGE of the image cache 300, and a time period F1. The video processor 306 may retrieve the image object IMAGE associated with the index INDEX and may periodically update the frame buffer 304 to animate the image object moving along a curve defined by the list of locations (X1,Y1), (X2,Y2) ... (Xn,Yn) over the time period F1 as depicted in FIG. 7.

Figure 8:
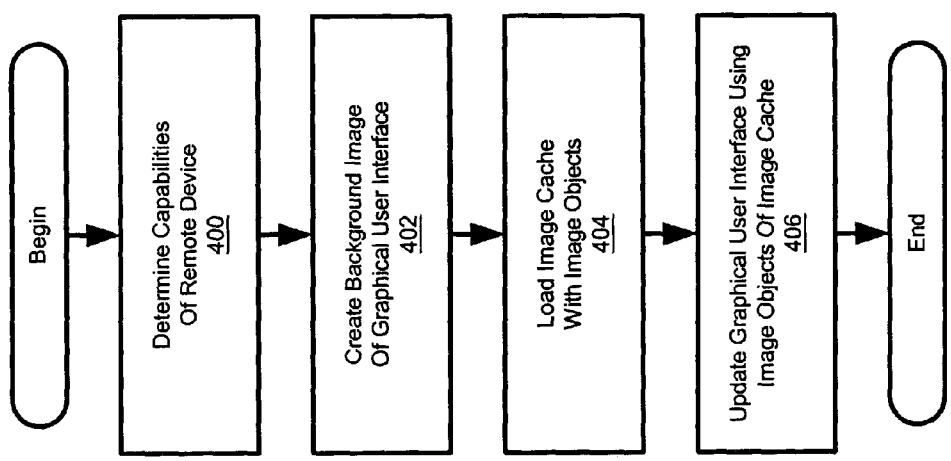
FIG. 8 illustrates an embodiment of a method to remotely display a graphical user interface that may be implemented by the system of FIG. 1.

A method for interface remoting is illustrated in FIG. 8. The system 100 in block 400 may determine the capabilities of the remote device 104. In one embodiment, the server 102 may obtain the capabilities of the remote device 104 from information obtained from the remote device 104 via the UPnP network protocol. In another embodiment, the server 102 may transmit a command to the remote device 104 that requests that the remote device 104 provide a response identifying its capabilities. The remote device 104 may simply provide information identifying the make, model, or other identifying information from which the server 102 may determine capabilities of the remote device 104. In other embodiments, the remote device 104 may return a capabilities structure identifying supported capabilities of the remote device 104. For example, the remote device 104 may return a structure that indicates the remote device 104 does not support rotating image objects.

In block 402, the system 100 may create a background image of the GUI. In one embodiment, the server 102 may create a background image for the remote device 104 by transmitting one or more DrawImage commands and/or DrawFillBox commands to the remote device 104 via the network 106. In response to the received DrawImage commands, the remote device 104 may store image objects IMAGE in the background buffer 302 at specified location (X1, Y1). Similarly, the remote device 104 in response to DrawFillBox commands may fill rectangular regions of the background buffer 302 that are defined by the location (X1, Y1) and (X2, Y2) with a color C.

The system 100 in block 404 may load the image cache 300 with image objects used to implement the displayed GUI. In one embodiment, the server 102 may load the image cache 300 by transmitting one or more LoadImage commands to the remote device 104. The remote device 104 may update its image cache 300 with the image objects IMAGE of the received LoadImage commands. The remote device 104 may further update its image cache 300 such that a stored image object IMAGE may be referenced and later retrieved with the index INDEX of the corresponding LoadImage command.

The system 100 in block 406 may update the displayed GUI using one or more motion commands (e.g. SetMotionVector, ImageMoveLine, ImageMoveCurve, ImageScale, ImageRotate, etc.). In one embodiment, the server 102 may update the GUI in response to various events by transmitting one or more display commands (e.g. SetMotionVector, DrawImage, etc.) to the remote device 104. Further, the remote device 104 may update its background buffer 302 and/or frame buffer 304 in response to executing the display commands received from the server 102. In one embodiment, the server 102 may update the GUI in response to events received from the remote device 104 via the network 106. For example, the server 102 may update the GUI in response to receiving an event from the remote device 104 that indicates an user has selected a menu option of the GUI via an input device (e.g. a remote controller). The server 102 may further update the GUI in response to events generated by an application or service executing on the server 102. For example, the server 102 may update the GUI in response to the application initiating a task such as, for example, streaming digital audio to the remote device 104 via the network 106.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method, comprising:
performing the following at a computer system that is separated from a server by a network for remotely displaying a graphical user interface, said computer system having the following: i) a frame buffer whose contents are to be rendered on a display of said computing system; ii) a buffer coupled to said frame buffer; iii) an image cache in which images for rendering on said display are locally stored on said computer system:
receiving from said server a first image together with a first command to render said first image on said display;
in response to said receiving, storing said first image in said buffer;
receiving from said server a second image together with a second command and an index, said second command commanding said computer system to store said second image into said image cache, said index for referencing said second image within said cache;
in response to said receiving of said second image, said second command and said index, storing said second image in said cache at a location identified by said index; and
receiving, from said server, a third command together with said index, a control flag, a plurality of display coordinates and a time period at said computer system from said server, wherein the third command is a motion vector command and said third command commanding said computer system to retrieve said second image from said cache without including pixel values generated by said computer system, directs an animation and rendering of the image object at the plurality of display coordinates over the received time period at a transition rate indicated by the control flag for the graphical user interface.

2. The method of claim 1 wherein said buffer is a background buffer.

3. The method of claim 2 wherein said first image and said first command are also received together with coordinates on said display where said first image is to be rendered.

4. The method of claim 1 wherein said method further comprises said computer system moving said first image from said buffer to said frame buffer.

5. The method of claim 4 wherein said method further comprises said computer system moving said second image from said image cache to said frame buffer.

6. The method of claim 5 wherein said method further comprises said computer system processing said second image with a video processor after said retrieval of said second image from said cache but before said second image is moved into said frame buffer.

7. A tangible computer readable storage medium containing stored program code as opposed to transitory electromagnetic signaling by itself that when processed by a computer system that is separated from a server by a network for remotely displaying a graphical user interface causes the following method to be performed, said computer system having the following: i) a frame buffer whose contents are to be rendered on a display of said computing system; ii) a buffer coupled to said frame buffer; iii) an image cache in which images for rendering on said display are locally stored on said computer system:
   receiving from said server a first image together with a first command to render said first image on said display;
   in response to said receiving, storing said first image in said buffer;
   receiving from said server a second image together with a second command and an index, said second command commanding said computer system to store said second image into said image cache, said index for referencing said second image within said cache;
   in response to said receiving of said second image, said second command and said index, storing said second image in said cache at a location identified by said index; and,
   receiving, from said server, a third command together with said index, a control flag, a plurality of display coordinates and a time period at said computer system from said server, wherein the third command is a motion vector command and said third command commanding said computer system to retrieve said second image from said cache without including pixel values generated by said computer system, directs an animation and rendering of the image object at the plurality of display coordinates over the received time period at a transition rate indicated by the control flag for the graphical user interface.

8. The tangible computer readable storage medium of claim 7 wherein said buffer is a background buffer.

9. The tangible computer readable storage medium of claim 8 wherein said first image and said first command are also received together with coordinates on said display where said first image is to be rendered.

10. The tangible computer readable storage medium of claim 7 wherein said method further comprises said computer system moving said first image from said buffer to said frame buffer.

11. The tangible computer readable storage medium of claim 10 wherein said method further comprises said computer system moving said second image from said image cache to said frame buffer.

12. The tangible computer readable storage medium of claim 11 wherein said method further comprises said computer system processing said second image with a video processor after said retrieval of said second image from said cache but before said second image is moved into said frame buffer.

13. A computer system comprising the following: i) a frame buffer whose contents are to be rendered on a display of said computing system; ii) a buffer coupled to said frame buffer; iii) an image cache in which images for rendering on said display are locally stored on said computer system, said computing system having a tangible readable storage medium containing program code that when processed by said computing system when said computing system is separated from a server by a network the following method is performed:
   receiving from said server a first image together with a first command to render said first image on said display;
   in response to said receiving, storing said first image in said buffer;
   receiving from said server a second image together with a second command and an index, said second command commanding said computer system to store said second image into said image cache, said index for referencing said second image within said cache;
   in response to said receiving of said second image, said second command and said index, storing said second image in said cache at a location identified by said index; and,
   receiving, from said server, a third command together with said index, a control flag, a plurality of display coordinates and a time period at said computer system from said server, wherein the third command is a motion vector command and said third command commanding said computer system to retrieve said second image from said cache without including pixel values generated by said computer system, directs an animation and rendering of the image object at the plurality of display coordinates over the received time period at a transition rate indicated by the control flag for the graphical user interface.

14. The computer system of claim 13 wherein said buffer is a background buffer.

15. The computer system of claim 14 wherein said first image and said first command are also received together with coordinates on said display where said first image is to be rendered.

16. The computer system of claim 13 wherein said method further comprises said computer system moving said first image from said buffer to said frame buffer.

17. The computer system of claim 16 wherein said method further comprises said computer system moving said second image from said image cache to said frame buffer.

18. The computer system of claim 17 wherein said method further comprises said computer system processing said second image with a video processor after said retrieval of said second image from said cache but before said second image is moved into said frame buffer.

19. A method, comprising:
   performing the following at a server that is separated from a computer system by a network for remotely displaying a graphical user interface, said computer system having the following: i) a frame buffer whose contents are to be rendered on a display of said computing system; ii) a buffer coupled to said frame buffer; iii) an image cache in which images for rendering on said display are locally stored on said computer system:
   sending to said computer system a first image together with a first command to render said first image on said display;

sending to said computer system a second image together with a second command and an index, said second command commanding said computer system to store said second image into said image cache, said index for referencing said second image within said cache; and sending to said computer system, a third command together with said index, a control flag, a plurality of display coordinates and a time period at said computer system from said server, wherein the third command is a motion vector command and said third command commanding said computer system to retrieve said second image from said cache without including pixel values generated by said computer system, directs an animation and rendering of the image object at the plurality of display coordinates over the received time period at a transition rate indicated by the control flag for the graphical user interface.

20. The method of claim 19 wherein said first image and said first command are also sent together with coordinates on said display where said first image is to be rendered.

21. A tangible computer readable storage medium containing stored program code as opposed to transitory electromagnetic signaling itself that when processed by a server that is separated from a computer system by a network causes the following method to be performed, said computer system having the following: i) a frame buffer whose contents are to be rendered on a display of said computing system; ii) a buffer coupled to said frame buffer; iii) an image cache in which images for rendering on said display are locally stored on said computer system:

sending to said computer system a first image together with a first command to render said first image on said display;

sending to said computer system a second image together with a second command and an index, said second command commanding said computer system to store said second image into said image cache, said index for referencing said second image within said cache; and, sending to said computer system, a third command together with said index, a control flag, a plurality of display coordinates and a time period at said computer system from said server, wherein the third command is a motion vector command and said third command commanding said computer system to retrieve said second image from said cache without including pixel values generated by said computer system, directs an animation and rendering of the image object at the plurality of display coordinates over the received time period at a transition rate indicated by the control flag for the graphical user interface.

22. The storage medium of claim 21 wherein said first image and said first command are also sent together with coordinates on said display where said first image is to be rendered.

* * * * *